(12) United States Patent
Maguire

(10) Patent No.: US 9,599,265 B2
(45) Date of Patent: Mar. 21, 2017

(54) MULTIPLE PLATE QUICK DISCONNECT SANDWICH FITTING

(71) Applicant: Stephen B. Maguire, West Chester, PA (US)

(72) Inventor: Stephen B. Maguire, West Chester, PA (US)

( * ) Notice: Subject to any disclaimer, the term of this patent is extended or adjusted under 35 U.S.C. 154(b) by 53 days.

(21) Appl. No.: 14/587,921

(22) Filed: Dec. 31, 2014

(65) Prior Publication Data

US 2015/0108748 A1 Apr. 23, 2015

Related U.S. Application Data

(63) Continuation-in-part of application No. 13/913,375, filed on Jun. 7, 2013, now Pat. No. 9,188,118, and a continuation-in-part of application No. 14/168,731, filed on Jan. 30, 2014.

(60) Provisional application No. 61/940,712, filed on Feb. 17, 2014.

(51) Int. Cl.
*F16L 37/08* (2006.01)
*F04B 53/16* (2006.01)
*F04B 53/22* (2006.01)

(52) U.S. Cl.
CPC .............. *F16L 37/08* (2013.01); *F04B 53/16* (2013.01); *F04B 53/22* (2013.01)

(58) Field of Classification Search
CPC . F16L 39/00; F16L 37/56; F04B 53/16; F04B 53/22
USPC .......................................... 285/124.1–124.5
See application file for complete search history.

(56) References Cited

U.S. PATENT DOCUMENTS

| 600,233 | A | 3/1898 | Palm |
| 1,451,759 | A | 4/1923 | Bruhn |
| 1,482,376 | A | 2/1924 | Anderson |
| 1,489,348 | A | 4/1924 | Hampton |
| 2,188,646 | A | 1/1940 | Bunch |
| 2,199,657 | A | 5/1940 | Bunch |
| 2,387,233 | A | 10/1945 | Clapp |
| 2,606,696 | A | 8/1952 | Miner |
| 2,656,828 | A | 10/1953 | Conover |
| 2,665,825 | A | 1/1954 | Poitras et al. |
| 2,701,881 | A | 2/1955 | McGee |
| 2,873,892 | A | 2/1959 | Nelson et al. |

(Continued)

FOREIGN PATENT DOCUMENTS

| CN | 2809263 Y | 8/2006 |
| DE | 3433693 A1 | 3/1986 |

(Continued)

OTHER PUBLICATIONS

Forty-four page two-sided brochure including cover and back pages entitled "Maguire: Auxiliary equipment for the plastics industry" of Maguire Products, Inc., Oct. 2000.

(Continued)

*Primary Examiner* — James Hewitt
(74) *Attorney, Agent, or Firm* — Fox Rothschild LLP

(57) ABSTRACT

A fitting allowing a quick connection and disconnection of liquid color conduits includes a quick disconnect plate assembly having three plates layered on top of each other, the top plate including guides sized to receive projections extending off structure to which the fitting is to be connected, with the middle plate including stops engaging with the same projections upon rotation of the structure.

2 Claims, 3 Drawing Sheets

(56) References Cited

U.S. PATENT DOCUMENTS

| | | |
|---|---|---|
| 2,909,315 A | 10/1959 | Sampietro |
| 2,956,822 A * | 10/1960 | Kates .................. E03B 5/06 285/123.9 |
| 3,391,645 A | 7/1968 | Koza |
| 3,477,698 A | 11/1969 | Smith et al. |
| 3,518,033 A | 6/1970 | Anderson |
| 3,785,412 A | 1/1974 | Stone |
| 3,814,388 A | 6/1974 | Jakob |
| 3,883,275 A | 5/1975 | Browne |
| 3,957,399 A | 5/1976 | Siczek |
| 3,988,088 A | 10/1976 | King et al. |
| 3,998,103 A | 12/1976 | Bjorklund et al. |
| 4,185,948 A | 1/1980 | Maguire |
| 4,469,127 A | 9/1984 | Kitamura |
| 4,473,173 A | 9/1984 | DeGroff et al. |
| 4,501,405 A | 2/1985 | Usry |
| 4,571,416 A | 2/1986 | Jarzombeck et al. |
| 4,586,882 A | 5/1986 | Tseng |
| 4,605,297 A | 8/1986 | Livingston et al. |
| 4,606,710 A | 8/1986 | Maguire |
| 4,621,990 A | 11/1986 | Forsythe et al. |
| 4,657,490 A | 4/1987 | Abbott |
| 4,759,189 A | 7/1988 | Stropkay |
| 4,834,071 A | 5/1989 | Hosoi et al. |
| 4,921,132 A | 5/1990 | Wales |
| 4,967,940 A | 11/1990 | Blette et al. |
| 5,039,279 A | 8/1991 | Natwick et al. |
| 5,116,547 A | 5/1992 | Tsukahara et al. |
| 5,199,852 A | 4/1993 | Danby |
| 5,215,215 A | 6/1993 | Sauer |
| 5,225,210 A | 7/1993 | Shimoda |
| 5,344,232 A | 9/1994 | Nelson et al. |
| 5,364,242 A | 11/1994 | Olsen |
| 5,609,191 A | 3/1997 | Topping |
| 5,622,392 A * | 4/1997 | Gochenouer ............ F16L 3/22 285/124.1 |
| 5,853,244 A | 12/1998 | Hoff et al. |
| 5,953,923 A | 9/1999 | Davies |
| 5,980,490 A | 11/1999 | Tsoukalis |
| 5,984,777 A | 11/1999 | Kuchar |
| 5,988,983 A | 11/1999 | Furusawa |
| 6,007,236 A | 12/1999 | Maguire |
| 6,057,514 A | 5/2000 | Maguire |
| 6,188,936 B1 | 2/2001 | Maguire et al. |
| 6,213,739 B1 | 4/2001 | Phallen et al. |
| 6,386,841 B1 | 5/2002 | Probst |
| 6,402,363 B1 | 6/2002 | Maguire |
| 6,502,013 B1 | 12/2002 | Sosnik |
| 6,523,451 B1 | 2/2003 | Liao |
| 6,599,005 B2 | 7/2003 | van Der Wei |
| 6,669,358 B2 | 12/2003 | Shimoda |
| 6,719,453 B2 | 4/2004 | Cosman et al. |
| 6,880,965 B1 | 4/2005 | Sheffield, Jr. |
| 6,991,004 B2 | 1/2006 | Kaufhold et al. |
| 7,118,349 B2 | 10/2006 | Oglesby |
| 7,154,069 B1 | 12/2006 | Gordon |
| 7,201,290 B2 | 4/2007 | Mehus |
| 7,311,882 B1 * | 12/2007 | Renzi .................. B01L 3/565 285/120.1 |
| 7,390,119 B2 | 6/2008 | Maguire |
| 7,416,096 B2 | 8/2008 | Maguire |
| 7,594,717 B2 | 9/2009 | Sheinman |
| 7,958,915 B2 | 6/2011 | Maguire |
| 7,980,834 B2 | 7/2011 | Maguire |
| 8,042,578 B2 | 10/2011 | Post |
| 8,627,852 B2 | 1/2014 | Hatton |
| 8,757,217 B2 | 6/2014 | Maguire |
| 8,800,821 B2 | 8/2014 | Maguire et al. |
| 9,188,118 B2 | 11/2015 | Maguire |
| 2002/0023449 A1 | 2/2002 | Park et al. |
| 2002/0031822 A1 | 3/2002 | Van Der Wei et al. |
| 2002/0122103 A1 | 9/2002 | Yamamoto et al. |
| 2002/0189667 A1 | 12/2002 | O'Dougherty et al. |
| 2003/0071868 A1 | 4/2003 | Koshikawa et al. |
| 2003/0142580 A1 | 7/2003 | Maguire |
| 2003/0218014 A1 | 11/2003 | Gregory et al. |
| 2005/0052945 A1 | 3/2005 | Maguire |
| 2005/0126638 A1 | 6/2005 | Gilbert |
| 2006/0067844 A1 | 3/2006 | Iversen |
| 2007/0071624 A1 | 3/2007 | Brewer |
| 2010/0322644 A1 | 12/2010 | Ajima |
| 2011/0200464 A1 | 8/2011 | Maguire et al. |
| 2012/0195771 A1 * | 8/2012 | Brender a Brandis ... F04B 9/14 417/313 |
| 2012/0260992 A1 | 10/2012 | Maguire |
| 2013/0334258 A1 | 12/2013 | Maguire |
| 2014/0087035 A1 | 3/2014 | Cummings |
| 2014/0147288 A1 | 5/2014 | Maguire |
| 2014/0224830 A1 | 8/2014 | Maguire |
| 2015/0020713 A1 | 1/2015 | Maguire |
| 2015/0066794 A1 | 3/2015 | Maguire et al. |
| 2015/0165662 A1 | 6/2015 | Maguire |
| 2016/0040661 A1 | 2/2016 | Maguire |

FOREIGN PATENT DOCUMENTS

| | | |
|---|---|---|
| FR | 1 477 595 A | 4/1967 |
| GB | 1145752 | 3/1969 |
| JP | 3550699 B2 | 8/2004 |
| WO | WO 01/49374 A1 | 7/2001 |
| WO | WO 2015/089499 | 6/2015 |

OTHER PUBLICATIONS

Two-sided color brochure entitled Maguire: Model MPA Liquid Color Pump, Maguire Products, Inc., published Dec. 28, 1995.
International Search Report for PCT/US02/02934, dated Feb. 20, 2003.
Written Opinion for PCT/US02/02934, dated Mar. 24, 2003.
International Search Report for PCT/US11/021994, dated May 24, 2011.
Written Opinion for PCT/US11/021994, dated May 24, 2011.
Thirty-two page catalog entitled "Maguire Color Blending Equipment" published by Maguire Products, Inc., 1993, United States.
International Search Report for PCT/US2014/070264 dated Apr. 15, 2015.
Written Opinion for PCT/US2014/070284 dated Apr. 15, 2015.
International Search Report for PCT/US2014/053391 dated Jan. 29, 2015.
Written Opinion for PCT/US2014/053391 dated Jan. 29, 2015.
Wayback Machine of SMC Linear Actuators Sep. 11, 2011, SMC, Accessed on Apr. 6, 2016.
Wayback Machine of SMC Linear Actuator CQ2 Series Catalog, Sep. 11, 2011, SMC, Accessed on Apr. 6, 2016.

* cited by examiner

MULTIPLE PLATE QUICK DISCONNECT SANDWICH FITTING

CROSS REFERENCE TO RELATED PATENT APPLICATION

This patent application is a continuation-in-part of U.S. patent application Ser. No. 13/913,375 filed 7 Jun. 2013 in the name of Stephen B. Maguire and now U.S. Pat. No. 9,188,118 issued 17 Nov. 2015, the priority of which is claimed under 35 USC 120. The '375 application claims the benefit of the priority under 35 USC 119 and 35 USC 120 of provisional U.S. patent application Ser. No. 61/660,326 filed 15 Jun. 2012 in the name of Stephen B. Maguire and entitled "Molded Diaphragm Pump." This patent application is also a continuation-in-part of U.S. patent application Ser. No. 14/168,731 filed 30 Jan. 2014 and published as US 2014/0147288 A-1 on 29 May 2014, the priority of which is also claimed under 35 USC 120. This patent application also claims the benefit of the priority under 35 USC 119 and 35 USC 120 of provisional U.S. patent application Ser. No. 61/940,712 filed 17 Feb. 2014 in the name of Stephen B. Maguire and entitled "Quarter Turn Adaptor/Delivery Tube Assembly for Liquid Color."

The disclosures of all of these applications are hereby incorporated in their entireties.

BACKGROUND OF THE INVENTION

This invention pertains principally but not exclusively to the use of liquid color in plastic molding and extrusion. The patent application even more specifically pertains to a multiple plate quick disconnect sandwich assembly preferably, but not necessarily, utilized with a liquid color pump installed on and forming a part of the lid of a liquid color container.

Pumps for liquid color are known, with one such pump being disclosed in U.S. Pat. No. 7,416,096, with another being disclosed in U.S. Pat. No. 7,980,834, and yet another being disclosed in U.S. Pat. No. 8,800,821. The disclosures of the '096, '834, and '821 patents are hereby incorporated by reference.

'096 discloses a container for liquid color material having a diaphragm liquid color pump located in the container for pumping liquid color from the container. The diaphragm liquid color pump is located in the container at the container bottom, where the pump can collect liquid color as the container empties. The pump is driven by a pneumatic piston-cylinder combination located outside the container, with a shaft extending downwardly from the pneumatic piston-cylinder combination to the diaphragm pump, to reciprocate the diaphragm back and forth to effectuate pumping action.

The '096 apparatus is relatively low in cost. The apparatus includes a liquid-tight fitting allowing liquid color output from the pump to be supplied directly to a plastics material processing machine, namely a molding press or an extruder, for the liquid color to impart color directly to plastic parts as they are manufactured.

The '834 apparatus provides pressure boosting, permitting liquid color to be injected into an extruder screw or a molding machine screw barrel at a position downstream, close to the position at which the finished plastic parts are molded or extruded.

'821 discloses a disposable low-cost pump in a container for liquid color, where the pump is fabricated from a plurality of PVC tubular members connected in a way to provide a pumping chamber. A piston is displaceable into the pumping chamber. A spring biases the piston outwardly from the chamber, in opposition to force applied by an air cylinder.

While these devices have merit and have proved commercially successful, there is a continuing need for lower cost, higher reliability quick connection apparatus to connect conduits to pumps and the like to provide liquid color from liquid color containers to injection and compression molding machines and to extruders, to color plastic parts in the course of manufacture thereof.

DESCRIPTION OF THE INVENTION

In one of its aspects, this invention provides a quick disconnect multiple plate sandwich assembly that is particularly adapted for connecting two conduits together with at least one of the conduits being within a structure to which the sandwich assembly is secured, preferably by bolts, for flow of liquid color therebetween and for facilitating rapid connection and disconnection of liquid color input fittings and liquid color out to and from a liquid color pump or other device. However, the invention is not limited to liquid color applications. The quick disconnect sandwich assembly fitting includes a first plate, a second plate, and a third plate. The three plates when assembled are superimposed on top of each other to form a sandwich structure, with the second plate positioned between the first plate and the third plate.

Each of the plates includes at least one circular arcuate interior opening, with all of the associated, corresponding openings on the respective plates formed on a common center. Desirably, each of the plates has two openings, one being larger than the other. The larger openings in each of the plates are referred to herein as being "associated" with corresponding larger openings that are present in each of the other plates. Desirably, each of the plates also includes a smaller opening. The smaller openings are also referred to herein as being "associated" with corresponding smaller openings that are desirably present in each of the other plates.

The diameter of an arcuate interior larger opening of the first plate, sometimes referred to herein as the "base" plate, is preferably the smallest of the three associated larger arcuate interior openings. The diameter of the larger arcuate interior opening of the second plate, sometimes referred to herein as the "spacer" plate, is the largest of the three associated larger arcuate interior openings. The diameter of the arcuate interior larger opening of the third plate, sometimes referred to herein as the "retainer" plate, is larger than that of the associated larger opening in the first plate and smaller than that of the associated large opening in the second plate.

The retaining aspect of the invention is preferably provided by interplay of the structures of the second and third plates and a conduit or conduit housing that is remotely connected to the second and third plates. The second plate preferably includes a pair of inwardly facing stops positioned oppositely one another on the larger arcuate interior opening. The third plate preferably includes a pair of guides formed in the larger arcuate interior opening, with each guide having a leading end and a trailing end. Receptors located at the leading end of each guide are axially displaced from a first surface of the third plate, opposite the surface of the third plate that contacts the second plate. The receptors each have upper and lower surfaces, with the lower surfaces of the receptors at the receptor first extremities being displaced in the axial direction from the first surface of the third plate. The upper and lower surfaces of the receptors taper smoothly from the extremities of the receptors to a junction with the guide.

The first, second, and third plates desirably each include a smaller second arcuate opening. As with the larger first arcuate opening, the associated smaller second arcuate opening of the second plate includes a pair of inwardly facing stops positioned oppositely one from another on the smaller arcuate interior opening, and the third plate includes a pair of guides formed in an associated smaller arcuate interior opening, with each guide having a leading end and a trailing end. Similarly, receptors located at the leading end of each guide are axially displaced from a first surface of the third plate opposite the surface contacting the second plate.

DESCRIPTION OF THE INVENTION

Figure 1:
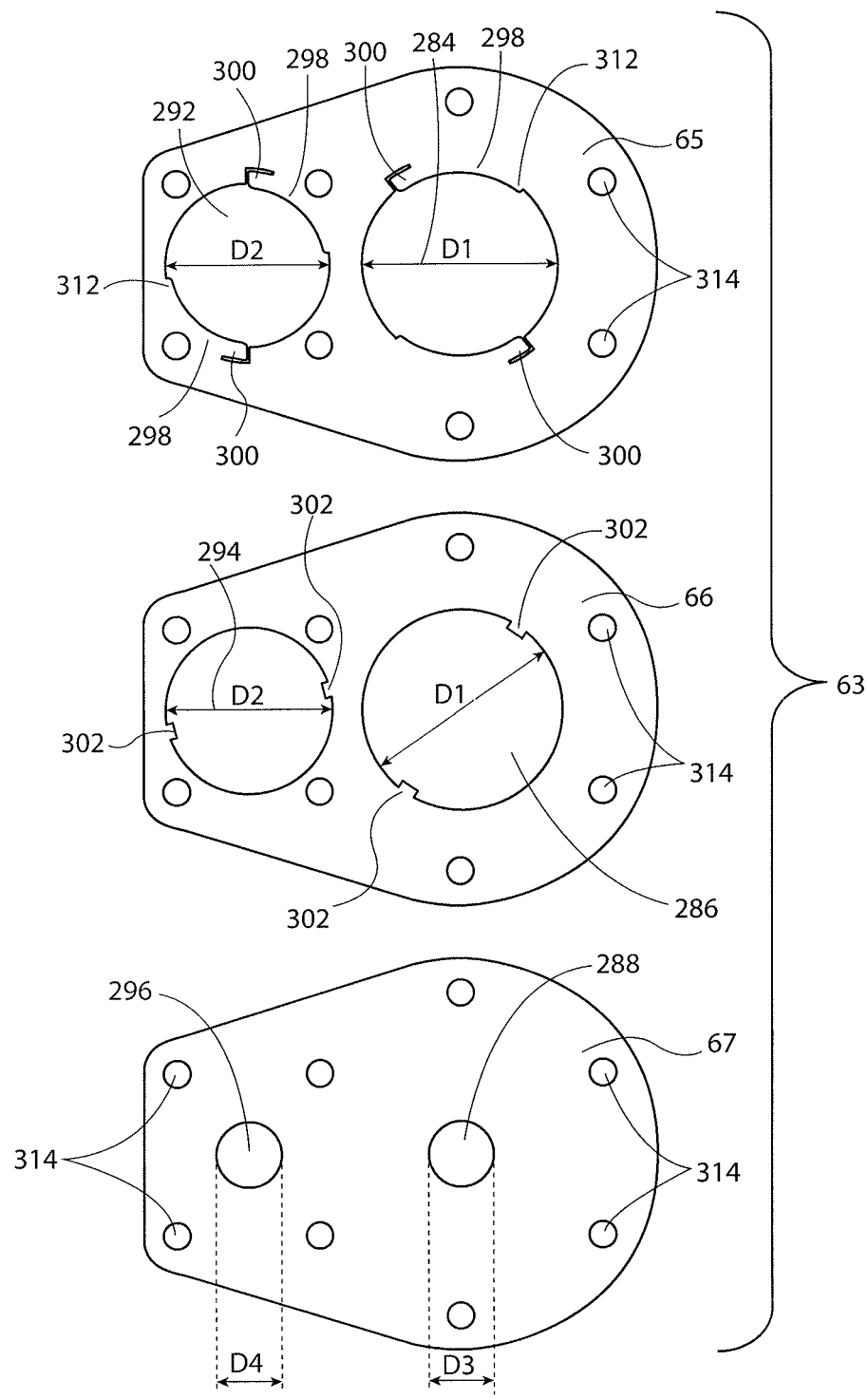
FIG. 1 is a top view of a retainer plate, a spacer plate, and a base plate manifesting aspects of the invention.
Figure 2:
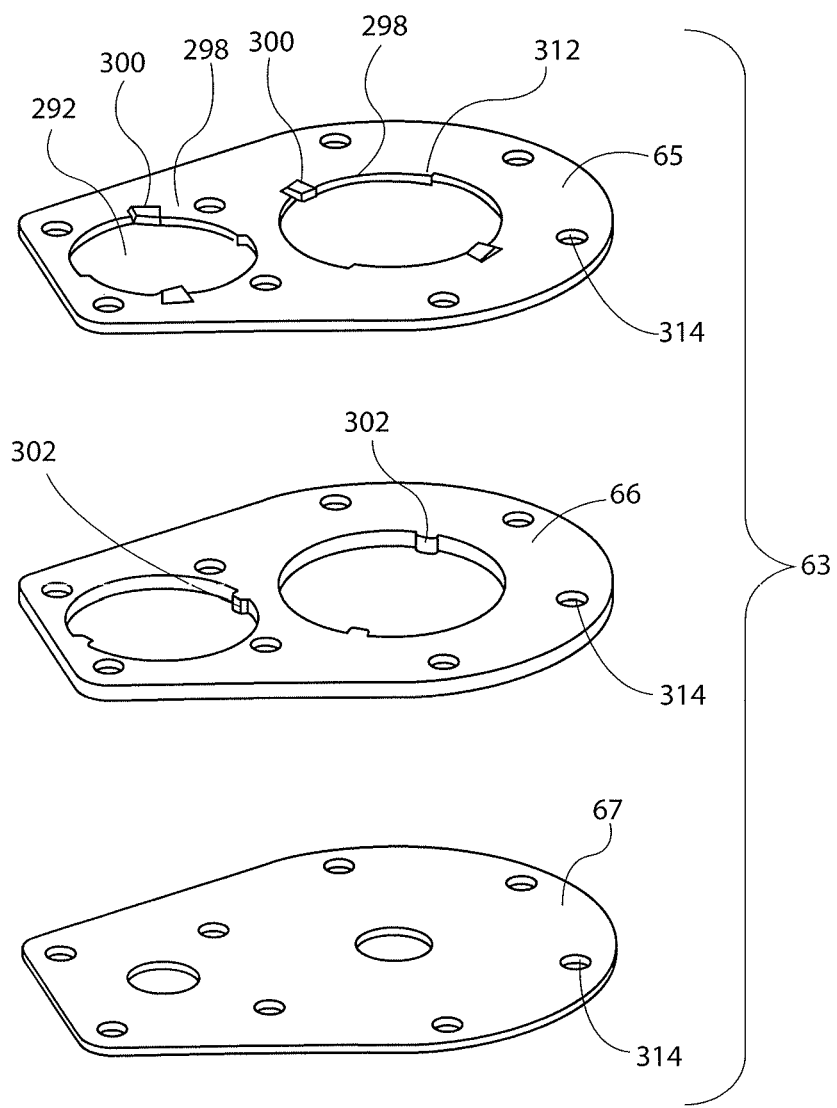
FIG. 2 is an exploded isometric schematic view of a multiple plate quick disconnect sandwich showing, from top to bottom, a retainer plate, a spacer plate, and a base plate.
Figure 3:
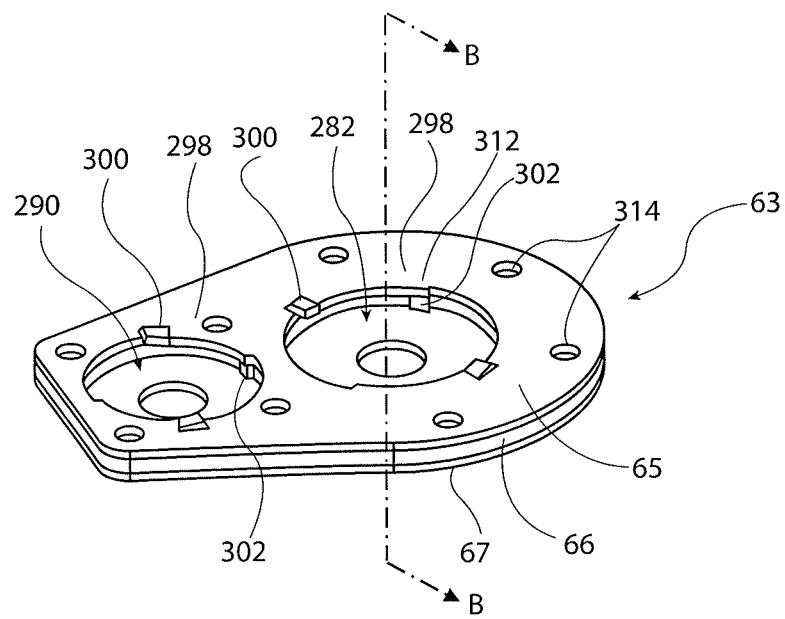
FIG. 3 is an isometric view of the multiple plate quick disconnect sandwich, illustrated in FIGS. 1 and 2 in assembled form.
Figure 4:
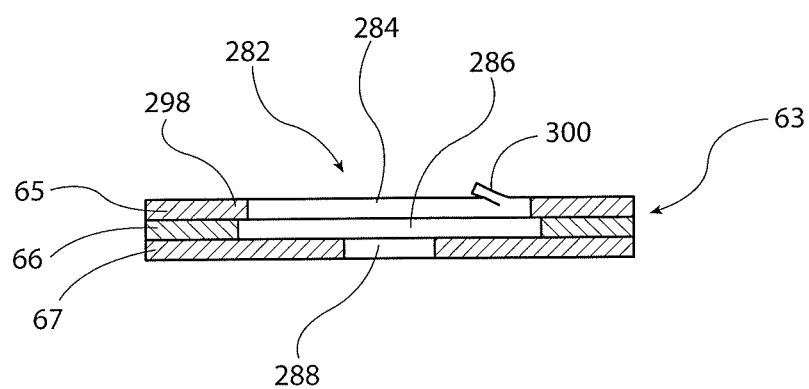
FIG. 4 is a sectional view of the assembled multiple plate quick disconnect sandwich taken at lines and arrows B-B in FIG. 3.

With reference to FIGS. 1 through 4, a multiple plate quick disconnect sandwich 63 includes a retainer plate 65, a spacer plate 66, and a base plate 67. Each of plates 65, 66, 67 desirably include generally annular openings that correspond to generally cylindrical connections of a pump inlet assembly and a pump outlet assembly or to conduits that are to be connected together and/or to pumps, to process machines, and the like. As depicted in the figures, the retainer plate 65 includes a larger arcuate passageway 284 and a smaller arcuate passageway 292; the spacer plate 66 includes a larger arcuate passageway 286 and a smaller arcuate passageway 294; and the base plate 67 includes a larger arcuate passageway 288 and a smaller arcuate passageway 296. As shown in FIGS. 3 and 4, the respective plates are desirably placed on one another to create the quick disconnect sandwich 63. In this configuration, the respective associated larger and associated smaller passageways in each plate form what may be either an inlet or an outlet arcuate passageway 282 and what may be either an inlet or outlet arcuate passageway 290. The arcuate larger passageways 284, 286 of retainer plate 65 and spacer plate 66 are preferably formed on the same radius such that they have the same diameter D1 and their respective smaller arcuate passageways 292, 294 have the same diameter D2.

Larger arcuate passageway 288 and smaller arcuate passageway 296 of base plate 67 are each preferably formed with smaller radii than that of associated larger arcuate passageways 284, 286 and associated smaller outlet passageways 292, 294, and have diameters D3 and D4, respectively.

Diameters D1, D2, D3, and D4 are preferably determined by the dimensions of the inlets and outlets being connected. Diameter D1 is preferably substantially equivalent to the cross-sectional width of an associated assembly from the outer edge of one lug to the outer edge of an opposing lug. Similarly, diameter D2 is preferably substantially equivalent to the cross-sectional width of an associated assembly from the outer edge of one lug to the outer edge of an opposing lug. Diameter D3 and diameter D4 are chosen according to the conduit inlets and outlets being connected using the quick disconnect sandwich.

Retainer plate 65 preferably includes pairs of arcuate retaining guides 298, 298A with the guides extending slightly into retainer plate arcuate passageway 284 and the retainer plate arcuate passageway 292 on opposite sides thereof to form regions of reduced diameter in arcuate passageway 282 and in arcuate passageway 290. Retaining guides 298, 298A preferably have an arc length of 80°, but it is understood that in alternative embodiments, the arc length of retaining guides 298, 298A may range from about 30° to about 150°.

Each retaining guide 298, 298A extends from an associated sloped leading tab 300 to a trailing edge 312, with tab 300 and edge 312 defining the angular extremities of arcuate retaining guides 298, 298A. Each sloped leading tab 300 is preferably angled upwardly, away from spacer plate 66, about ten degrees with respect to the planar surface of retainer plate 65, which is opposite from the surface of plate 65 that facingly contacts plate 66.

Spacer plate 66 includes preferably generally rectangular stops 302 extending from the inner periphery of the arcuate passageways 286, 294 of spacer plate 66. As shown in FIG. 3, when plates 65, 66, 67 are placed on top of each other to form the quick disconnect sandwich 63, stops 302 are preferably both axially and angularly aligned with trailing edges 312 of retainer plate 65.

Each plate 65, 66, 67 of quick disconnect sandwich 63 includes openings 314 that align with the with openings in a structure or container or mechanism to allow for mounting quick disconnect sandwich 63 to a structure or container or mechanism or a conduit for which rapid connection/disconnection of another structure or container or mechanism or conduit is desired. Nut and bolt combinations are preferably used for such mounts.

As respecting the operation of the invention, after quick disconnect sandwich 63 is assembled as shown in FIGS. 3 and 4, and is attached to a structure or container or mechanism or conduit, the structure to be quickly connected/disconnected may be centered over the arcuate passageway 290 of quick disconnect plate assembly 63 in a position such that a lower portion, of a structure to be connected, extends through arcuate passageway 296 of the quick disconnect base plate 67 and appropriately sized and positioned lugs are adjacent the sloped leadings tabs 300 of the retaining guides 298 while a lower planar surface of the lugs rests on the upper surface of the quick disconnect retainer plate 65. As the apparatus to be connected is rotated, the lug portions of the apparatus slide under sloped leading tabs 300 and then continue to moveably slide under the remainder of retaining guide 298 along the surface of the quick disconnect base plate until the lugs abut stops 302 on the quick disconnect spacer plate 66. Due to the angled configuration of the sloped leading tabs 300, the structure to be connected is gradually pressed against the outwardly facing surface of the quick disconnect base plate 67 as the structure to be connected is rotated into place. The overhang formed by the retaining guides 298 prevents displacement of the lugs of the structure to be connected in the vertical direction.

Because stops 302 are preferably located nearly or directly below trailing edge 312 of the retaining guide 298, the structure to be connected preferably only requires approximately a quarter turn to transition from an unlocked position, in which the lugs of the structure to be connected are located outside leading tabs 300 of retaining guide 298, to a locked position, in which the lugs of the structure to be connected are adjacent stops 302. To disconnect, the structure is rotated a quarter turn in the opposite direction such that the lugs of the structure slide out from under the leading tabs 300.

The invention claimed is:

1. A fitting for connecting conduit carrying liquid color, comprising:
   a) a first plate, a second plate, and a third plate, wherein the plates are superimposed on top of each other, with the second plate positioned between the first plate and the third plate, each plate having an arcuate interior opening, the arcuate interior opening of each plate being formed on a common center, a diameter of the arcuate interior opening of the first one of the plates being the smallest of the three arcuate interior openings and being circular;
   b) a diameter of the arcuate interior opening of the second plate being the largest of the three arcuate interior openings;
   c) a diameter of the arcuate interior opening of the third plate being larger than that of the diameter of the arcuate interior opening of the first plate and smaller than that of the diameter of the arcuate interior opening of the second plate;
   d) the second plate being between and in facing complemental contact with the first and third plates, the second plate having a pair of inwardly facing stops positioned oppositely one another on the arcuate interior opening;
   e) the third plate having a pair of guides formed in the arcuate interior opening, each guide having a leading end and a trailing end, the guides having receptor portions located at the leading end being axially displaced from a first surface of the third plate opposite the surface contacting the second plate, the receptor portions having upper and lower surfaces, the lower surfaces of the receptor portions at the first extremities of the receptor portions being displaced in the axial direction from the first surface of the third plate;
   f) the upper and lower surfaces of the guides tapering smoothly from the extremities of the receptor portion the juncture with the remaining part of the guide.

2. The fitting of claim 1, wherein
   a) each plate further comprises a second arcuate interior opening, the second arcuate interior opening of each plate being formed on a common center, a diameter of the second arcuate interior opening of the first one of the plates being the smallest of the three second arcuate interior openings and being circular;
   b) a diameter of the second arcuate interior opening of the second plate being the largest of the three second arcuate interior openings;
   c) a diameter of the second arcuate interior opening of the third plate being larger than that of the first plate and smaller than that of the second plate;
   d) the second plate being between and in facing complemental contact with the first and third plates, the second plate having a pair of inwardly facing stops positioned oppositely one another on the second arcuate interior opening;
   e) the third plate having a pair of guides formed in the second arcuate interior opening, each guide having a leading end and a trailing end, the guides having receptor portions located at the leading end being axially displaced from a first surface of the third plate opposite the surface contacting the second plate, the receptor portions having upper and lower surfaces, the lower surfaces of the receptor portions at the first extremities of the receptor portions being displaced in the axial direction from the first surface of the third plate;
   f) the upper and lower surfaces of the guides tapering smoothly from the extremities of the receptor portion the juncture with the remaining part of the guide.

\* \* \* \* \*